US012479975B2

(12) United States Patent
Bienmueller et al.

(10) Patent No.: US 12,479,975 B2
(45) Date of Patent: Nov. 25, 2025

(54) POLYAMIDE COMPOSITIONS

(71) Applicant: ENVALIOR DEUTSCHALND GMBH, Duesseldorf (DE)

(72) Inventors: Matthias Bienmueller, Krefeld (DE); Jochen Endtner, Cologne (DE)

(73) Assignee: ENVALIOR DEUTSCHLAND GMBH, Duesseldorf (DE)

( * ) Notice: Subject to any disclaimer, the term of this patent is extended or adjusted under 35 U.S.C. 154(b) by 0 days.

(21) Appl. No.: 17/837,091

(22) Filed: Jun. 10, 2022

(65) Prior Publication Data
US 2022/0403140 A1 Dec. 22, 2022

(30) Foreign Application Priority Data
Jun. 15, 2021 (EP) .................................. 21179448

(51) Int. Cl.
*C08K 5/1515* (2006.01)
*C08K 3/22* (2006.01)
*C08L 77/02* (2006.01)

(52) U.S. Cl.
CPC .............. *C08K 5/1515* (2013.01); *C08K 3/22* (2013.01); *C08L 77/02* (2013.01); *C08K 2003/2224* (2013.01); *C08K 2003/2227* (2013.01)

(58) Field of Classification Search
CPC .......... C08L 77/00; C08L 77/02; C08L 63/00; C08K 2003/2224; C08K 2003/2227
See application file for complete search history.

(56) References Cited

U.S. PATENT DOCUMENTS

| | | |
|---|---|---|
| 3,644,574 A | 2/1972 | Jackson, Jr. et al. |
| 3,654,575 A | 4/1972 | Cluwen |
| 4,097,446 A | 6/1978 | Abolins et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,937,285 A | 6/1990 | Wittmann et al. |
| 5,309,215 A | 5/1994 | Schumann |
| 5,764,358 A | 6/1998 | Heffels |
| 6,061,130 A | 5/2000 | Plate et al. |
| 6,093,759 A | 7/2000 | Gariess et al. |
| 7,547,743 B2 | 6/2009 | Goto et al. |
| 7,907,279 B2 | 3/2011 | Seifert et al. |
| 8,202,124 B1 | 6/2012 | Natter et al. |
| 8,568,155 B2 * | 10/2013 | Sebald ................... H01R 24/28 439/304 |
| 8,780,196 B2 | 7/2014 | Vennewald |
| 10,088,404 B2 | 10/2018 | Dietrich et al. |
| 10,486,535 B2 | 11/2019 | Kim et al. |
| 10,988,041 B2 | 4/2021 | de Chazal et al. |
| 2002/0125428 A1 | 9/2002 | Gan et al. |
| 2004/0138381 A1* | 7/2004 | Blasius, Jr. ............. C08L 63/10 525/131 |
| 2007/0031670 A1* | 2/2007 | Fournier ................ C09K 21/02 428/375 |
| 2013/0092226 A1* | 4/2013 | Pawlik .................... B32B 27/34 428/447 |
| 2014/0309367 A1* | 10/2014 | Bradley ................. C08G 69/48 525/426 |
| 2015/0232664 A1 | 8/2015 | Guo et al. |
| 2017/0051127 A1 | 2/2017 | Morick et al. |

FOREIGN PATENT DOCUMENTS

| | | | |
|---|---|---|---|
| CN | 104559147 A | | 4/2015 |
| CN | 110938246 A | * | 3/2020 |
| CN | 111518367 A | | 8/2020 |
| DE | 232760 A1 | | 2/1986 |
| DE | 260 764 A1 | | 10/1988 |
| DE | 278 859 A1 | | 5/1990 |
| DE | 41 29 105 A1 | | 3/1993 |
| DE | 43 13 688 A1 | | 11/1994 |
| DE | 196 28 348 C1 | | 9/1997 |
| DE | 10 316 615 A1 | | 10/2004 |
| DE | 10 2004 056 520 A1 | | 6/2006 |
| DE | 102 18 413 B4 | | 9/2008 |
| DE | 10 2012 002 882 B4 | | 4/2021 |
| EP | 0561548 A1 | | 9/1993 |
| EP | 728 811 A3 | | 8/1996 |
| EP | 3 670 589 A1 | | 6/2020 |
| JP | 2015-025025 | | 2/2015 |
| JP | 2016-139490 | | 8/2016 |
| JP | 2016147919 A | * | 8/2016 |
| JP | 2016176060 A | * | 10/2016 |
| JP | 2020019861 A | * | 2/2020 |

OTHER PUBLICATIONS

Machine translation of CN 110938246 (2020, 6 pages).*
Machine translation of JP-2020019861-A (2020, 23 pages).*
Machine translation of JP 2016/14919 (2016, 42 pages).*
Machine translation of JP 2016176060 (2016, 46 pages).*
European Search Report from corresponding European Application No. 21179448, dated Nov. 23, 2021, two pages.
Database WPI Week 201557 Thomson Scientific, London, GB; AN 2015-40348A XP002804819, 2015.

(Continued)

*Primary Examiner* — Brieann R Johnston

(74) *Attorney, Agent, or Firm* — NIXON & VANDERHYE P.C.

(57) ABSTRACT

The present invention relates to flame retardant polyamide-based compositions or moulding materials and to articles of manufacture of the electricals or electronics industries producible therefrom, in particular charging components, containing at least one polyamide, aluminium oxide, magnesium hydroxide and at least one organic epoxide.

19 Claims, No Drawings

(56) References Cited

OTHER PUBLICATIONS

Database WPI Week 202007 Thomson Scientific, London, GB; AN 2020-78680K XP002804820, 2020.
Notice of Preliminary Rejection, KR Application No. 2022-0070499, Sep. 17, 2025 (English translation).

* cited by examiner

POLYAMIDE COMPOSITIONS

CROSS-REFERENCE TO RELATED APPLICATIONS

This application claims the benefit of priority of European Patent Application No. 21179448.2 filed on Jun. 15, 2021, the disclosure of which is hereby incorporated by reference.

FIELD OF THE INVENTION

The present invention relates to flame retardant polyamide-based compositions or moulding materials and to articles of manufacture of the electricals or electronics industries producible therefrom, in particular charging components, containing at least one polyamide, aluminium oxide, magnesium hydroxide and at least one organic epoxide.

BACKGROUND OF THE INVENTION

Current-carrying electrical components, in particular charging components for charging electrical batteries, in particular for use in electromobility, generate heat when current flows through the connections and cables of the charging components. Typical charging components are charging cable plugs and charging inlets as shown in FIG. 1 of DE 10 2012 002 882 B4. In order to promote developments in electromobility, attempts have been made to standardize the connections of charging components, in particular the interface between the charging inlet and the charging cable plug, over the whole electric vehicle industry. For example the Society of Automotive Engineers ("SAE") has specified such an interface in SAE J1772.

The information in SAE J1772 shows that it is desirable to increase the current transferred via the connections for charging, in particular, a motor vehicle battery. However at higher currents the connections and the power cables are subjected to a temperature increase which can damage the components of the charging inlet in the motor vehicle. For example a charging inlet for a battery system of an electric vehicle (EV) or a hybrid electric vehicle (HEV) can generate heat via the connections and the cables of the charging inlet during a charging operation.

DE 10 2020 108 175 A1 solves the problem of the heat occurring during charging with charging infrastructure for a motor vehicle battery by means of a cable heat exchanger which comprises a coolant channel for a coolant flow through the cable heat exchanger for active cooling of the conductor of the power cable.

The solution of EP 3 470 254 B1 consists of a digital apparatus for preventing overheating of a charging inlet, wherein the charging time is measured and the temperature of the charging inlet is estimated to define the temperature of the charging inlet based on charging times and charging currents for particular charging voltages and to prevent the temperature of the charging inlet from exceeding a certain threshold temperature.

Discussed as an alternative are electrically insulating, thermally conductive plastics for more effective dissipation of the heat in current-carrying conductors. However, the flame retardancy desired in many applications is problematic, with a V-O classification in the UL94 test often being stipulated for the field of battery and charging infrastructure in electromobility. The tight installation space and the desire to make the heat transfer path through the electrically insulating plastic to an external heat dissipation medium as short as possible necessarily lead to the requirement that a UL94 V-0 classification is to be achieved even at very thin wall thicknesses, and at least at 0.75 mm. The resulting challenge is that of providing an inherently thermally insulating plastic with electrically insulating, thermally conductive additives and flame retardants in such a way that in addition to an isotropic thermal conductivity of at least 1 W/mK, a V-0 classification at wall thicknesses ≤0.75 mm and moreover a mechanical stability sufficient for the application is nevertheless ensured.

EP 3 133 104 A1 attempts to solve this problem by means of a polyamide moulding material containing magnesium hydroxide and boron nitride. While a UL94 V-0 flammability classification is achieved even at 0.75 mm, as well as a thermal conductivity >1 W/mK, this is at the cost of insufficient mechanical properties for many applications, in particular with regard to flexural strength and outer fibre strain. EP 3 133 104 A1 further employs boron nitride which due to its anisotropic thermal conductivity demands increased design effort from the manufacturer and must also be viewed critically in ecological terms on account of its complex and energy-intensive mode of production.

CN 104559147 A discloses a flame retardant polyamide-based composition containing a polyamide, aluminium oxide, magnesium oxide and an organic epoxide. The examples of CN 104559147 A employ inter alia glycidyloxypropyltrimethoxysilane.

CN 111518367 A discloses a highly efficient thermally conductive film for use in the electronics industry containing an epoxide, an impact modifier, aluminium oxide, magnesium hydroxide, polyamide, boron nitride, silicone rubber, pigments and a vulcanizing agent. Polypropylene glycol diglycidyl ether may be employed as an impact modifier.

Finally, reference is also made to WO 2014/036720 A1 which claims thermally conductive polymer compositions comprising
(a) about 20% by weight to about 60% by weight of an organic polymer selected from polyamide, polyester and polyolefin;
(b) about 30% by weight to about 70% by weight of a thermally conducting additive selected from magnesium hydroxide or aluminium hydroxide oxide; and
(c) about 1% by weight to about 10% by weight of a polyarylene sulfide, wherein all percentages by weight are based on the total weight of the polymer composition and this exhibits greater flame retardancy than an otherwise identical polymer composition without the polyarylene sulfide.

Starting from the prior art the problem addressed by the present invention is accordingly that of providing, ideally without the use of boron nitride, an electrically insulating, thermally conductive polyamide-based composition/moulding material which allows a UL94 V-0 flammability classification at wall thicknesses ≤0.75 mm and achieves an ideally isotropic thermal conductivity of at least 1 W/mK, while nevertheless achieving good mechanical properties.

An ideally isotropic thermal conductivity is in particular to be understood as meaning that the ratio of the thermal conductivity perpendicular to the flow direction ("through plane") to the thermal conductivity in the flow direction ("in plane") is in the range from 0.65 to 1.5.

Good mechanical properties is to be understood as meaning an outer fibre strain of at least 1.5% and a flexural strength of at least 150 MPa in the flexural test according to ISO178-A and an impact strength of at least 20 KJ/m$^2$ according to ISO180-1U.

SUMMARY OF THE INVENTION

The problem is solved by the subject matter of the present invention which comprises compositions or molding materials containing
- at least one polyamide, preferably semicrystalline polyamides,
- aluminium oxide,
- magnesium hydroxide and
- at least one organic, halogen-free, epoxidized compound, preferably having at least two epoxy groups per molecule.

However, the present invention also provides articles of manufacture of the electricals or electronics industries, preferably charging components, particularly preferably battery charging components for charging electrical batteries, especially preferably battery charging components for charging electrical batteries for electromobility, based on compositions containing
- at least one polyamide, preferably semicrystalline polyamides,
- aluminium oxide,
- magnesium hydroxide and
- at least one organic, halogen-free, epoxidized compound, preferably having at least two epoxy groups per molecule.

However, the invention also relates to a process for producing articles of manufacture of the electricals or electronics industries, preferably for producing charging components, particularly preferably for producing battery charging components for charging electrical batteries, in particular for producing batteries for electromobility, where compositions containing
- a) at least one polyamide, preferably semicrystalline polyamides,
- b) aluminium oxide,
- c) magnesium hydroxide and
- d) at least one organic, halogen-free, epoxidized compound, preferably having at least two epoxy groups per molecule, are processed into moulding materials by mixing, extruded in a water bath, cooled until pelletizable and pelletized and employed in an injection moulding process. Alternatively, the moulding material may also be sent for injection moulding directly after the mixing of the components a) to d).

Preparation of the compositions to be employed according to the invention for processing by injection moulding is effected initially through mixing of the components a), b), c) and d) to be employed as starting materials and optionally further components in at least one mixing apparatus. This preferably effects processing of the components to be employed into a moulding material by kneading, compounding, extruding or roller-milling. This processing is preferably carried out at a temperature in the range from 230° C. to 330° C.

Processing to afford the moulding material is especially preferably effected by compounding in a corotating twin-screw extruder or Buss kneader. It may be advantageous to premix individual components. Moulding materials based on the compositions according to the invention are obtained as intermediates. These moulding materials may either consist exclusively of the components a) to d) or else contain further components in addition to the components a) to d). The moulding materials likewise according to the invention and preferably produced in a ZSK 26 Compounder twin-screw extruder from Coperion Werner & Pfleiderer (Stuttgart, Germany) at a temperature of about 290° C. are extruded in a water bath, cooled until pelletizable and pelletized. The pelletized material is subsequently dried to constant weight in a vacuum drying cabinet, preferably at temperatures in the range of 70+/−10° C., before it is supplied to an injection moulding machine. The process of injection moulding is known to those skilled in the art;

DETAILED DESCRIPTION OF THE PREFERRED EMBODIMENTS OF THE INVENTION

Per 100 parts by mass of the component a) the compositions according to the invention preferably employ the component b) in amounts in the range from 20 to 300 parts by mass, preferably in the range from 35 to 250 parts by mass, particularly preferably in the range from 50 to 180 parts by mass and very particularly preferably in the range from 70 to 120 parts by mass.

Per 100 parts by mass of the component a) the compositions according to the invention preferably employ the component c) in amounts in the range from 20 to 350 parts by mass, preferably in the range from 50 to 300 parts by mass, particularly preferably in the range from 85 to 250 parts by mass and very particularly preferably in the range from 120 to 210 parts by mass.

Per 100 parts by mass of the component a) the compositions according to the invention preferably employ the component d) in amounts in the range from 0.1 to 25 parts by mass, preferably in the range from 1 to 16 parts by mass, particularly preferably in the range from 2 to 10 parts by mass.

For clarity it should be noted that the scope of the present invention encompasses all reported definitions, reported amounts and parameters in general or in preferred ranges in any desired combinations. This relates to the compositions, moulding materials and articles of manufacture according to the invention and to processes according to the invention and uses according to the invention. Unless stated otherwise, cited standards are applicable in the version valid at the filing date. Unless otherwise stated, reported percentages are percentages by weight.

Component a)

Polyamides to be employed according to the invention are preferably semicrystalline polyamides which according to DE 10 2011 084 519 A1 have a melting enthalpy in the range from 4 to 25 J/g measured by the DSC method according to ISO 11357 in the 2nd heating and integration of the melting peak.

Polyamides to be employed as component a) preferably have a melting point of at least 180° C. Polyamide 6 (PA 6) or polyamide 66 (PA 66) or a copolyamide of PA6 or PA66 are particularly preferred. The use of PA 6 is especially particularly preferred.

The nomenclature of the polyamides used in the context of the present application conforms to international standards/DIN 7728, the first number(s) denoting the number of carbon atoms in the starting diamine and the last number(s) denoting the number of carbon atoms in the dicarboxylic acid. If only one number is stated, as in the case of PA 6, this means that the starting material was an $\alpha,\omega$-aminocarboxylic acid or the lactam derived therefrom, i.e. E-caprolactam in the case of PA 6; for further information, reference is made to H. Domininghaus, Die Kunststoffe und ihre Eigenschaften, pages 272 ff., VDI-Verlag, 1976.

The component a) employed is preferably a low-viscosity polyamide having a viscosity number determined in a 0.5% by weight solution in 96% by weight sulfuric acid at 25° C. according to ISO 307 in the range from 80 to 135 ml/g, particularly preferably in the range from 90 to 130 ml/g, very particularly preferably in the range from 90 to 125 ml/g, especially preferably in the range from 95 to 115 ml/g.

In a particularly preferred embodiment the component a) employed is a polyamide 6 having a viscosity number determined in a 0.5% by weight solution in 96% by weight sulfuric acid at 25° C. according to ISO 307 in the range from 95 to 115 ml/g.

The polyamides to be employed in the thermoplastic moulding materials according to the invention may be produced by various processes and may be synthesized from different building blocks. A multiplicity of procedures are known for producing polyamides, with different monomer building blocks and also various chain transfer agents for setting a desired molecular weight or else monomers having reactive groups for later intended aftertreatments being used depending on the desired end product.

The industrially relevant processes for producing the polyamides to be employed according to the invention typically proceed via polycondensation in the melt. In the context of the present invention the hydrolytic polymerization of lactams is also considered to be polycondensation.

Component b)

The component b) employed is preferably $\alpha$-$Al_2O_3$.

In the case of the industrial aluminium oxide preferred for use in the context of the present invention the proportion of $\alpha$-$Al_2O_3$ is more than 70%. It is particularly preferable when an aluminium oxide having a proportion of $\alpha$-$Al_2O_3$ of more than 90% is concerned. It is very particularly preferable when an aluminium oxide having a proportion of $\alpha$-$Al_2O_3$ of more than 95% is concerned. Particular preference according to the invention is given to $\alpha$-$Al_2O_3$ comprising less than 5% by weight of impurities, very particularly preferably comprising less than 1% by weight of impurities.

Component b) is preferably employed as powder. Preferred powders have a volume-average particle size d50 determinable according to ISO13320 of not more than 100 μm, preferably a volume-average particle size $d_{50}$ in the range from 0.1 to 50 μm, particularly preferably a volume-average particle size $d_{50}$ in the range from 0.5 to 10 μm, very particularly preferably a volume-average particle size $d_{50}$ in the range from 0.5 to 5 μm. The lower volume-average particle size $d_{10}$ determinable according to ISO13320 for component b) is preferably in the range from 0.01 to 20 μm, particularly preferably in the range from 0.05 to 10 μm, very particularly preferably in the range from 0.1 to 5 μm and especially preferably in the range from 0.3 to 2 μm.

The upper volume-average particle size $d_{90}$ determinable according to ISO13320 for component b) is preferably not more than 200 μm, particularly preferably in the range from 1 to 100 μm, very particularly preferably in the range from 1.5 to 50 μm, especially preferably in the range from 2 to 10 μm.

As component b) it is preferable to employ an aluminium oxide having a volume-average particle size distribution determinable by laser diffraction according to ISO 13320 having a $d_{50}$ of not more than 100 μm, a $d_{10}$ in the range from 0.01 to 20 μm and a $d_{90}$ of not more than 200 μm. The invention therefore preferably relates to compositions and moulding materials and articles of manufacture producible therefrom, with the proviso that they employ as component b) an aluminium oxide having a volume-average particle size distribution determinable by laser diffraction according to ISO 13320 having a $d_{50}$ of not more than 100 μm, a $d_{10}$ in the range from 0.01 to 20 μm and a doo of not more than 200 μm.

It is particularly preferable to employ $Al_2O_3$ having a monomodal, volume-average particle size distribution determinable by laser diffraction according to ISO 13320; see EP 3 670 589 A1. Evaluation of the data obtained by laser diffraction is carried out using a volume-related histogram having a logarithmic abscissa. To this end the particle sizes are divided into size classes. Each decade is subdivided into 18 size classes over a measurement range of 0.01 μm to 10 000 μm. This results in 108 size classes whose breadth corresponds to the size class y of formula $$y = 0.01 \cdot e^{\frac{ln(10) \cdot x}{18}} - 0.01 \cdot e^{\frac{ln(10) \cdot (x-1)}{18}}$$

wherein x describes the consecutive number of size classes in the range from 1 to 108.

According to the invention a monomodal particle size distribution is present when the plot of the volume of the aluminium oxide particle sizes in [%] (=Y-axis in the histogram) against the size class in micrometres [μm] (=X-axis in the histogram) preferably forms only one maximum in the form of a Gaussian curve and any further maxima occurring do not exceed a volume of 10%.

The term "particle size distribution" derives from statistics. This field considers frequencies and frequency distributions of any feature, for example manufacturing tolerances. In the field of particle technology and particle measurement technologies/dispersity analysis, the equivalent diameter of a particle is chosen as the feature. Particle size distribution is derived from the general frequency distribution of statistics. The density distribution of particle sizes is typically in the shape of a Gaussian bell curve. If the density distribution of particle sizes has merely one maximum, this is known as a monomodal distribution. In the case of two maxima the distribution is bimodal. The abscissa value of the largest maximum is known as the modal value. The particle size distribution of aluminium oxide is determined by laser diffraction according to ISO13320. In the context of the present invention measurement was carried out using the optical material data for aluminium oxide and said data were evaluated in accordance with Mie theory.

$d_{10}$, $d_{50}$ and $d_{90}$ are those diameters for which 10%, 50% (median) and 90% respectively of the particles, based on the total volume, have a smaller diameter.

As component b) it is particularly preferable to employ an aluminium oxide having a monomodal, volume-average particle size distribution determinable by laser diffraction according to ISO 13320 having a $d_{50}$ of not more than 100 μm, a $d_{10}$ in the range from 0.01 to 20 μm and a do in the range from 1 to 100 μm. The invention therefore particularly preferably relates to compositions and moulding materials and articles of manufacture producible therefrom, with the proviso that they employ as component b) an aluminium oxide having a monomodal, volume-average particle size distribution determinable by laser diffraction according to ISO 13320 having a $d_{50}$ of not more than 100 μm, a $d_{10}$ in the range from 0.01 to 20 μm and a do in the range from 1 to 100 μm.

As component b) it is very particularly preferable to employ an aluminium oxide having a monomodal, volume-average particle size distribution determinable by laser diffraction according to ISO 13320 having a $d_{50}$ in the range from 0.1 to 50 μm, a $d_{10}$ in the range from 0.01 to 20 μm and a $d_{90}$ in the range from 1 to 100 μm. The invention therefore very particularly preferably relates to compositions and moulding materials and articles of manufacture producible therefrom, with the proviso that they employ as component b) an aluminium oxide having a monomodal, volume-average particle size distribution determinable by laser diffraction according to ISO 13320 having a $d_{50}$ in the range from 0.1 to 50 μm, a $d_{10}$ in the range from 0.01 to 20 μm and a $d_{90}$ in the range from 1 to 100 μm.

As component b) it is especially particularly preferable to employ an aluminium oxide having a monomodal, volume-average particle size distribution determinable by laser diffraction according to ISO 13320 having a $d_{50}$ in the range from 0.5 to 5 μm, a $d_{10}$ in the range from 0.5 to 2 μm and a $d_{90}$ in the range from 2 to 10 μm. The invention therefore especially particularly preferably relates to compositions and moulding materials and articles of manufacture producible therefrom, with the proviso that they employ as component b) an aluminium oxide having a monomodal, volume-average particle size distribution determinable by laser diffraction according to ISO 13320 having a $d_{50}$ in the range from 0.5 to 5 μm, a $d_{10}$ in the range from 0.5 to 2 μm and a $d_{90}$ in the range from 2 to 10 μm.

The $Al_2O_3$ particles to be employed as component b) according to the invention may be present in different forms describable by the aspect ratio. It is preferable to employ particles having an aspect ratio of 1 to 100, particularly preferably 1 to 30, very particularly preferably 1 to 10. EP 3 164 694 A1 describes a number of processes for determining the aspect ratio. In camera-based processes the particles are imaged on the sensor of the camera as two-dimensional images. When the sensor is a CCD matrix or a CMOS image sensor, appropriate image analysis software is used for particle shape determination. DE 198 02 141 C1 describes a solution comprising a matrix camera and EP 1 972 921 A1 describes a solution comprising two cameras. When the sensor is a CCD linear array, the imaged particle area is assembled from the measured chord lengths at known particle velocity. Appropriate apparatuses and processes are described in DE 10 2009 056 503 A1 (with sensor line), DE 10 2004 056 520 A1 (with CCD line), DE 43 13 688 A1 (with CCD line), DE 41 19 240 C2 (with CCD line), DD 278 859 A1 (with CCD line sensor), DD 260 764 A1 (with CCD line sensor) and DD 232760 A1 (with single-line television camera). DE 196 28 348 C1 proposes determining particle shape with a line of individual optical waveguides, wherein a second optical waveguide line is used for determining velocity. Diffraction-based processes utilize the dependence of the particle diffraction pattern on particle shape. The particles are irradiated with coherent light and the light intensity distribution of the diffraction pattern is measured with a suitable receiver. The distribution of the light intensity in the diffraction pattern depends on the shape of the particles. Solutions therefor are described in DE 694 06 683 T2 (with ring sensor) and DE 102 18 413 B4. Patent specification DE 41 29 105 A1 discloses determination of particle shape using scattered light measurement. Since the recited processes differ merely in cost and complexity, a person skilled in the art may choose freely from these processes recited in the prior art.

$Al_2O_3$ to be employed as component b) according to the invention is preferably provided with at least one surface modification based on at least one aminosilane. The term surface modification refers to silane-based organic coupling agents intended to improve bonding to the thermoplastic matrix.

Preferred surface treatment agents/surface modifications are aminosilanes of general formula

$$(RO)_3-Si-(CH_2)_n-X \qquad (I)$$

wherein
R represents an organic radical selected from the group consisting of methyl, ethyl, isopropyl and methoxymethyl,
n represents an integer from 0 to 12 inclusive, and
X represents amine.

The employed surface treatment/surface modification of the component b) is preferably at least one aminosilane selected from the group of 3-aminopropyltriethoxysilane [CAS 919-30-2], 3-aminopropyltrimethoxysilane [CAS 13822-56-5], N-(2-aminoethyl)-3-aminopropyltrimethoxysilane [CAS 1760-24-3], N-(2-aminoethyl)-3-aminopropyltriethoxysilane [CAS 5089-72-5], 3-(N-cyclohexylamino)propyltrimethoxysilane [CAS 3068-78-8] and N,N-(diethylaminomethyl) triethoxysilane [CAS 15180-47-9].

Silane-based surface modifications according to the invention and production thereof are in principle known to those skilled in the art from U.S. Pat. No. 7,547,743 B2, the contents of which having regard to the production disclosed therein of organopolysiloxanes are fully incorporated by reference in the present application.

It is preferable when the aminosilane to be employed for the surface modification is applied in amounts in the range from 0.05 to 5 parts by mass, particularly preferably in amounts in the range from 0.1 to 1 parts by mass, based on 100 parts by mass of aluminium oxide.

The surface treatment/surface modification of the aluminium oxide with aminosilane may be carried out immediately before use of the aluminium oxide or previously surface-treated aluminium oxide may be employed. Upon contact with the aluminium oxide the abovementioned aminosilanes react to afford silanols and the respective alcohol radical is eliminated.

As component b) it is especially preferable according to the invention to employ Martoxid® MPS-2 [CAS No. 1344-28-1] from Martinswerk GmbH, Bergheim, Germany.

Component c)

The component c) employed is magnesium hydroxide [CAS No. 1309-42-8].

Magnesium hydroxide [CAS No. 1309-42-8] may be impure as a result of its origin and mode of production. Typical impurities include, for example, silicon-, iron-, calcium- and/or aluminium-containing species which may be intercalated, for example, in the form of oxides in the magnesium hydroxide crystals. The purity of the magnesium hydroxide results from a proportion of species other than magnesium hydroxide that is as small as possible. The magnesium hydroxide preferred for use as component c) has a silicon proportion determinable by X-ray fluorescence (XRF) on calcined substance according to ISO 12677 of <15 000 ppm, preferably <5000 ppm and particularly preferably <500 ppm.

The magnesium hydroxide to be employed in accordance with the invention particularly preferably has a purity, i.e. an Mg (OH) 2 proportion, of at least 96% by weight, preferably at least 98% by weight.

It is particularly preferable when, in addition to the silicon content and/or in addition to the purity, the magnesium hydroxide to be employed according to the invention has an iron content (Fe) determinable by X-ray fluorescence (XRF) on calcined substance according to ISO 12677 of <1500 ppm, preferably <1000 ppm, particularly preferably <300 ppm.

In particular, the magnesium hydroxide is of non-mineral, i.e. synthetic, origin. Preferably contemplated methods of producing component b) of synthetic origin are pyrohydrolysis of aqueous magnesium salt chloride solutions or precipitation of magnesium salt solutions with calcined slaked dolomite or milk of lime.

Magnesium hydroxide to be employed as component c) may be unsized or else sized. A size is an impregnation liquid applied by spraying or immersion before further processing of a component, in this case the magnesium hydroxide, to improve the profile of properties or processing of a component. Component c) is preferably provided with sizes based on stearates or aminosiloxanes, particularly preferably with aminosiloxanes.

Magnesium hydroxide preferably to be employed as component c) has an average particle size $d_{50}$ in the range from 0.5 μm to 6 μm, wherein a $d_{50}$ in the range from 0.7 μm to 3.8 μm is preferable and a $d_{50}$ in the range from 1.0 μm to 2.6 μm is particularly preferable. A suitable method of measurement for determining the $d_{50}$ is in particular laser diffraction, measured with a Malvern Mastersizer 2000 for example. The desired particle sizes may for example be achieved by grinding magnesium hydroxide. In connection with the average particle sizes in this application, their determination and their significance, reference is made to Chemie Ingenieur Technik (72) pp. 273-276, 3/2000, Wiley-VCH Verlags GmbH, Weinheim, 2000 according to which the $d_{50}$ value is that particle size below which 50% of the amount of particles lie (median value). The $d_{50}$ value of component b) is determined in accordance with the invention by laser diffraction (light scattering) as per ISO 13320 after dispersion in water as per ISO 14887. Alternative dispersants are described in table 2 of the white paper "Dispersing Powders in Liquid for Particle Size Analysis" from Horiba Instruments Inc, Albany, New York, 2013.

Magnesium hydroxide types suitable in accordance with the invention include in particular Magnifin@ H5IV from Martinswerk GmbH, Bergheim, Germany or Hidromag® Q2015 TC from Penoles, Mexico City, Mexico, wherein Magnifin@ H5IV is especially preferred.

Component d)

The production of the organic, halogen-free, epoxidized compounds having at least two epoxy groups per molecule to be employed as component d) is known to those skilled in the art. Preferred organic, halogen-free, epoxidized compounds are polyglycidyl ethers or poly(beta-methylglycidyl) ethers, preferably obtainable by reaction of a compound having at least two free alcoholic or phenolic hydroxyl groups and/or by reaction of phenolic hydroxyl groups with epichlorohydrin.

Preferred polyglycidyl ethers or poly(beta-methylglycidyl) ethers derive from acyclic alcohols, in particular ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylpropane, bistrimethylolpropane, pentaerythritol, sorbitol, and from polyepichlorohydrins.

Alternatively preferred polyglycidyl ethers or poly(beta-methylglycidyl) ethers derive from cycloaliphatic alcohols, in particular 1,3- or 1,4-dihydroxycyclohexane, bis(4-hydroxycyclohexyl) methane, 2,2-bis(4-hydroxycyclohexyl) propane or 1,1-bis(hydroxymethyl) cyclohex-3-ene, or they comprise aromatic nuclei based on N,N-bis(8, 2-hydroxyethyl) aniline or p,p'-bis(2-hydroxyethylamino) diphenylmethane.

Preferred organic epoxidized compounds are also based on mononuclear phenols or on polynuclear phenols. Preferred mononuclear phenols are resorcinol or hydroquinone. Preferred polynuclear phenols are bis(4-hydroxyphenyl) methane, 2,2-bis(4-hydroxyphenyl) propane, 2,2-bis(3,5-dibromo-4-hydroxyphenyl) propane or 4,4'-dihydroxydiphenylsulfone, wherein 2,2-bis(4-hydroxyphenyl) propane is particularly preferred.

Preferred condensation products of phenols with formaldehyde are phenol novolacs. Epoxidized compounds very particularly preferably to be employed as component d) according to the invention are those which are based on polynuclear phenols and comprise at least one, preferably 2, terminal epoxy groups. These may be produced for example by a process according to US2002/0128428 A1, wherein variants having an epoxy index determinable according to ISO 3001 in the range from 300 to 2000 grams per equivalent are in turn preferred. Variants having an epoxy index determinable according to ISO 3001 in the range from 450 to 1500 grams per equivalent are particularly preferred and variants having an epoxy index determinable according to ISO 3001 in the range from 450 to 750 grams per equivalent are very particularly preferred.

Organic, halogen-free epoxy compounds having at least 2 epoxy functions also preferred as component d) or thus alternatively employable according to the invention contain in any desired combination and frequency not only the epoxy-containing unit

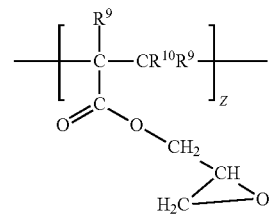

but also the unit

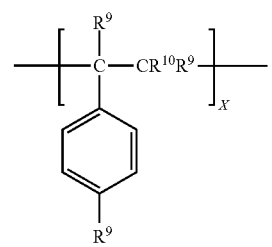

and/or the unit

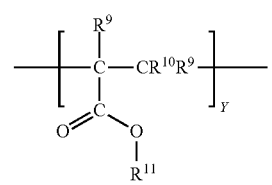

wherein $R^9$, $R^{10}$ independently of one another represent H or $C_1$-$C_8$-alkyl, $R^{11}$ represents $C_1$-$C_8$-alkyl, X and Y each represent integers in the range from 0 to 20, with the proviso that either X or Y is ≥1 at least once, Z represents an integer in the range from 2 to 20 and R* represents H or $C_1$-$C_8$-alkyl, wherein the units designated X, Y, Z may occur repeatedly and in any desired sequence.

The chain terminus of the organic, halogen-free epoxy compounds is thus formed by the end groups R* which independently of one another represent H or $C_1$-$C_8$-alkyl.

It is preferable when an organic, halogen-free epoxide employable as component d) conforms to formula (II)

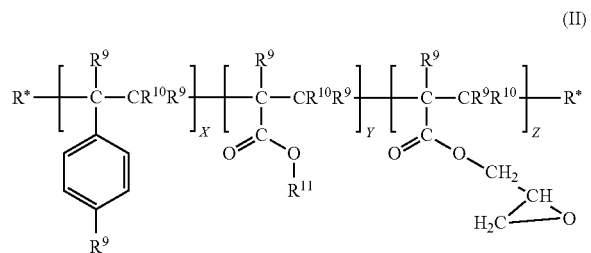
(II)

wherein $R^9$, $R^{10}$ independently of one another represent H or $C_1$-$C_8$-alkyl, $R^{11}$ represents $C_1$-$C_8$-alkyl, X and Y each represent integers in the range from 0 to 20, with the proviso that either X or Y is ≥1 at least once, Z represents an integer in the range from 2 to 20 and R* represents H or $C_1$-$C_8$-alkyl, wherein the units designated X, Y, Z may occur repeatedly and in any desired sequence.

In a particularly preferred embodiment the component d) employed is selected from epoxy-functional compounds based on glycidyl methacrylate-modified styrene-containing polymers obtainable by polymerization of glycidyl methacrylate with styrene and optionally acrylic acid and/or methacrylic acid based on DE 10 316 615 A1, wherein one or more acrylic acid esters may be employed instead of or in addition to acrylic acid and one or more methacrylic acid esters may be employed instead of or in addition to methacrylic acid. Preferred esters are those based on methyl, ethyl, propyl, n-butyl, t-butyl, 2-ethylhexyl and/or benzyl. These are also commercially available. These are in particular random terpolymers of ethylene, methyl acrylate and glycidyl methacrylate which are known under the name Lotader® from Arkema, Colombes, France, especially Lotader@ AX8700 and Lotader AX8900. It is also possible to replace ethylene, completely or partially, with other olefins, in particular alpha-olefins, preferably having 2 to 10 carbon atoms. Preferred olefins are selected from the group comprising ethene, propene, 1-butene, 1-pentene, 1-hexene, 1-octene, 3-methyl-1-pentene. Particularly preferred olefins are ethene and propene, very particular preference being given to ethene.

In a further preferred or alternative embodiment epoxidized fatty acid esters of glycerol, in particular epoxidized vegetable oils, are employed as component d). These are obtained by epoxidation of the reactive olefin groups of triglycerides of unsaturated fatty acids. Epoxidized fatty acid esters of glycerol may be produced starting from unsaturated fatty acid esters of glycerol, preferably from vegetable oils, and organic peroxycarboxylic acids (Prilezhaev reaction). Processes for producing epoxidized vegetable oils are described for example in Smith, March, March's Advanced Organic Chemistry, 5th edition, Wiley-Interscience, New York, 2001. Preferred epoxidized fatty acid esters of glycerol are vegetable oils. An epoxidized fatty acid ester of glycerol particularly preferred for use as component d) according to the invention is epoxidized soybean oil [CAS No. 8013 Jul. 8].

Organic, halogen-free, aromatic epoxy compounds having 2 terminal epoxy functions particularly preferred for use as component d) according to the invention are oligomeric reaction products of bisphenol A with epichlorohydrin. It is particularly preferable to employ as component d) an organic, halogen-free, oligomeric reaction product of formula (III) from the reaction of bisphenol A with epichlorohydrin,

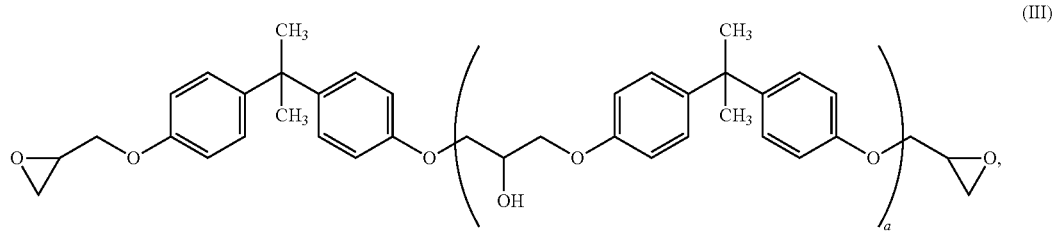
(III)

addition to acrylic acid and one or more methacrylic acid esters may be employed instead of or in addition to methacrylic acid. Preferred esters are those based on methyl, ethyl, propyl, n-butyl, t-butyl, 2-ethylhexyl and/or benzyl. Such components d) are also commercially available. These are known in particular under the name Joncryl® from BASF AG, specifically Joncryl® ADR4400.

In a further preferred or alternative embodiment the component d) employed is selected from epoxy-functional compounds based on glycidyl methacrylate- and/or glycidyl acrylate-modified ethylene-acrylate copolymers obtainable by polymerization of ethylene, glycidyl methacrylate and/or glycidyl acrylate and acrylic acid and/or methacrylic acid, wherein one or more acrylic acid esters may be employed in which a represents an integer in the range from 0 to 12, preferably in which a represents an integer in the range from 1 to 8, particularly preferably in which a represents an integer in the range from 1 to 6, very particularly preferably in which a represents an integer in the range from 2 to 4 and especially particularly preferably in the range from 2 to 3, wherein a represents the average number of repeating units.

According to their stoichiometry such reaction products of formula (III) then exhibit an average rounded molecular weight determinable according to EN ISO 10927 of 900 to 1500 g/mol for the particularly preferred range with a in the range from 2 to 4.

An epoxy compound employable as component d) according to the invention preferably has a Mettler softening point determinable according to DIN 51920 in the range from 0° C. to 150° C., particularly preferably in the range from 50° C. to 120° C., very particularly preferably in the range from 60° C. to 110° C. and in particular in the range from 75° C. to 95° C. The Mettler softening point is the temperature at which the sample flows out of a cylindrical nipple having an outflow opening of 6.35 mm in diameter, thus interrupting a light gate which lies 19 mm below. To this end, the sample is heated in air under constant conditions.

Especially particularly preferred among the recited epoxy compounds to be employed as component d) according to the invention are oligomeric reaction products of bisphenol A with epichlorohydrin of general formula (III) [CAS No. 25068-38-6] having an epoxy index determinable according to ISO 3001 in the range from 450 to 600 grams per equivalent and a softening point determinable according to DIN 51920 in the range from 75° C. to 95° C. These are obtainable for example as Araldite® GT7071 or Araldite® GT7072 from Huntsman Advanced Materials, Everberg, Belgium.

Component e)

In a preferred embodiment compositions according to the invention and moulding materials producible therefrom as well as articles of manufacture in turn producible therefrom, in particular charging components, also contain in addition to the components a), b), c) and d) at least one component e), an additive distinct from a), b), c) and d). The at least one additive to be employed as component e) is preferably employed in amounts in the range from 0.01 to 30 parts by mass based on 100 parts by mass of the component a).

Preferred additives of the component e) are lubricants and demoulding agents, UV stabilizers, colourants, chain-extending additives, plasticizers, flow promoters, heat stabilizers, antioxidants, gamma-ray stabilizers, hydrolysis stabilizers, elastomer modifiers, antistats, emulsifiers, nucleating agents, processing aids, anti-drip agents, flame retardants distinct from component c) and fillers and reinforcers distinct from component b).

The additives of the component e) may be used alone or in admixture/in the form of masterbatches.

It is preferable to employ halogen-free additives.

Lubricants and demoulding agents are selected from at least one of the group of long-chain fatty acids, salts of long-chain fatty acids, ester derivatives or amide derivatives of long-chain fatty acids and montan waxes.

Preferred long-chain fatty acids are stearic acid or behenic acid. Preferred salts of the long-chain fatty acids are calcium or zinc stearate. Preferred ester derivatives of long-chain fatty acids are those based on pentaerythritol, more particularly $C_{16}$-$C_{18}$ fatty acid esters of pentaerythritol [CAS No. 68604-44-4] or [CAS No. 85116-93-4]. Preferred amide derivatives of long-chain fatty acids are those based on ethylenediamine, in particular ethylene-bis-stearylamide [CAS No. 110-30-5].

Montan waxes in the context of the present invention are mixtures of straight-chain saturated carboxylic acids having chain lengths of 28 to 32 carbon atoms. It is particularly preferable in accordance with the invention to employ lubricants and/or demoulding agents from the group of esters or amides of saturated or unsaturated aliphatic carboxylic acids having 8 to 40 carbon atoms with aliphatic saturated alcohols having 2 to 40 carbon atoms and metal salts of saturated or unsaturated aliphatic carboxylic acids having 8 to 40 carbon atoms, wherein ethylene-bis-stearylamide and/or ethylene glycol dimontanate, here in particular Licowax® E [CAS No. 74388-22-0] from Clariant, Muttenz, Basel, are very particularly preferred and ethylene-bis-stearylamide [CAS No. 110-30-5], for example available as Loxiol® EBS from Emery Oleochemicals GmbH, Düsseldorf, Germany, is especially particularly preferred.

Preferably employed as UV stabilizers are substituted resorcinols, salicylates, benzotriazoles, triazine derivatives or benzophenones.

Preferably employed as colourants are organic pigments, preferably phthalocyanines, quinacridones, perylenes, and dyes, preferably nigrosin or anthraquinones, also inorganic pigments, in particular titanium dioxide (if not already used as filler), ultramarine blue, iron oxide, zinc sulfide or carbon black.

Suitable as the titanium dioxide preferred for use as a pigment according to the invention in one embodiment are titanium dioxide pigments whose parent oxides can be produced by the sulfate (SP) or chloride (CP) process and have an anatase and/or rutile structure, preferably a rutile structure. The parent oxide need not be stabilized but a specific stabilization is preferred: for the CP parent oxide by Al doping of 0.3-3.0% by weight (calculated as $Al_2O_3$) and an oxygen excess in the gas phase during the oxidation of the titanium tetrachloride to titanium dioxide of at least 2%; for the SP parent oxide by doping for example with Al, Sb, Nb or Zn. A "light" stabilization with Al or, at higher Al doping quantities, compensation with antimony is particularly preferred. It is known that when using titanium dioxide as white pigment in paints and coatings, plastics materials etc., unwanted photocatalytic reactions caused by UV absorption lead to decomposition of the pigmented material. This involves absorption of light in the near ultraviolet range by titanium dioxide pigments, thus forming electron-hole pairs which produce highly reactive free radicals on the titanium dioxide surface. The free radicals formed result in binder decomposition in organic media. It is preferable according to the invention to reduce the photoactivity of the titanium dioxide by inorganic aftertreatment thereof, particularly preferably with oxides of Si and/or Al and/or Zr and/or through the use of Sn compounds.

It is preferable when the surface of pigmentary titanium dioxide has a covering of amorphous precipitated oxide hydrates of the compounds $SiO_2$ and/or $Al_2O_3$ and/or zirconium oxide. The $Al_2O_3$ shell facilitates pigment dispersion into the polymer matrix; the $SiO_2$ shell makes it more difficult for charge exchange to take place at the pigment surface, thus preventing polymer degradation.

According to the invention the titanium dioxide is preferably provided with hydrophilic and/or hydrophobic organic coatings, in particular with siloxanes or polyalcohols.

Titanium dioxide [CAS No. 13463-67-7] preferred for use according to the invention as a colourant of component e) preferably has an average particle size $d_{50}$ in the range from 90 to 2000 nm, particularly preferably in the range from 200 to 800 nm. The average particle size $d_{50}$ is the value determined from the particle size distribution at which 50% by weight of the particles have an equivalent sphere diameter smaller than this $d_{50}$ value. The relevant standard is ISO 13317-3.

The reported values for particle size distribution and average particle size for titanium dioxide are based on so-called surface-based particle sizes, in each case before incorporation into the thermoplastic moulding material. Particle size determination is performed in accordance with the invention by laser diffractometry, see C. M. Keck, Moderne Pharmazeutische Technologie 2009, Freie Universität Berlin, Chapter 3.1. or QUANTACHROME PARTIKELWELT NO 6, June 2007, pages 1 to 16.

Commercially available titanium dioxides include for example Kronos® 2230, Kronos® 2233, Kronos® 2225 and Kronos® vlp7000 from Kronos, Dallas, USA.

Plasticizers preferred for use as component e) are dioctyl phthalate, dibenzyl phthalate, butyl benzyl phthalate, hydrocarbon oils or N-(n-butyl)benzenesulfonamide.

Flow promoters preferred for use as component e) are copolymers containing at least one α-olefin with at least one methacrylic ester or acrylic ester of an aliphatic alcohol. Copolymers of at least one α-olefin with at least one methacrylic ester or acrylic ester of an aliphatic alcohol are particularly preferred. Copolymers of an α-olefin and an acrylic ester of an aliphatic alcohol are very particularly preferred. Copolymers where the α-olefin is formed from ethene and/or propene and the methacrylic ester or acrylic ester contains as its alcohol component linear or branched alkyl groups having 6 to 20 carbon atoms are especially preferred. A copolymer of ethene and 2-ethylhexyl acrylate is especially very particularly preferred. Copolymers suitable as flow auxiliaries in accordance with the invention are notable not only for the composition but also for the low molecular weight. Correspondingly, preference is given especially to copolymers having an MFI measured at 190° C. and a loading of 2.16 kg of at least 100 g/10 min, preferably of at least 150 g/10 min, particularly preferably of at least 300 g/10 min. The MFI, melt flow index, characterizes the flow of a melt of a thermoplastic and is subject to the standards ISO 1133 or ASTM D 1238. The MFI, and all figures relating to the MFI in the context of the present invention, relate or were measured or determined in a standard manner according to ISO 1133 at 190° C. with a test weight of 2.16 kg.

Elastomer modifiers preferred for use as component e) comprise inter alia one or more graft polymers of e.1 5% to 95% by weight, preferably 30% to 90% by weight, of at least one vinyl monomer e.2 95% to 5% by weight, preferably 70% to 10% by weight, of one or more graft substrates having glass transition temperatures <10° C., preferably <0° C., particularly preferably <-20° ° C. The weight percentages are in this case based on 100% by weight of the elastomer modifier to be employed as component e).

The graft substrate e.2 generally has an average particle size ($d_{50}$) in the range from 0.05 to 10 μm, preferably in the range from 0.1 to 5 μm, particularly preferably in the range from 0.2 to 1 μm.

Monomers e. 1 are preferably mixtures of e.1.1 50% to 99% by weight of vinylaromatics and/or ring-substituted vinylaromatics, in particular styrene, α-methylstyrene, p-methylstyrene, p-chlorostyrene, and/or ($C_1$-$C_8$)-alkyl methacrylates, in particular methyl methacrylate, ethyl methacrylate, and e.1.2 1% to 50% by weight of vinyl cyanides, in particular unsaturated nitriles such as acrylonitrile and methacrylonitrile, and/or ($C_1$-$C_8$)-alkyl (meth)acrylates, in particular methyl methacrylate, glycidyl methacrylate, n-butyl acrylate, t-butyl acrylate, and/or derivatives, in particular anhydrides and imides of unsaturated carboxylic acids, in particular maleic anhydride or N-phenylmaleimide. The percentages by weight are in this case based on 100% by weight of the elastomer modifier employable as component e).

Preferred monomers e. 1.1 are selected from at least one of the monomers styrene, α-methylstyrene and methyl methacrylate; preferred monomers e.1.2 are selected from at least one of the monomers acrylonitrile, maleic anhydride, glycidyl methacrylate and methyl methacrylate.

Particularly preferred monomers are e.1.1 styrene and e.1.2 acrylonitrile.

Graft substrates e.2 suitable for the graft polymers to be employed in the elastomer modifiers include, for example, diene rubbers, EPDM rubbers, i.e. those based on ethylene/propylene and optionally diene, and also acrylate, polyurethane, silicone, chloroprene and ethylene/vinyl acetate rubbers. EPDM stands for ethylene-propylene-diene rubber.

Preferred graft substrates e.2 are diene rubbers, in particular based on butadiene, isoprene etc., or mixtures of diene rubbers or copolymers of diene rubbers or mixtures thereof with further copolymerizable monomers, in particular as per e.1.1 and e.1.2, with the proviso that the glass transition temperature of component e.2 is <10° C., preferably <0° C., particularly preferably <-10° C.

Particularly preferred graft substrates e.2 are ABS polymers (emulsion, bulk and suspension ABS), wherein ABS stands for acrylonitrile-butadiene-styrene, as described, for example, in DE-A 2 035 390 or in DE-A 2 248 242 or in Ullmann, Enzyklopädie der Technischen Chemie, vol. 19 (1980), pp. 277-290.

The elastomer modifiers/graft polymers are produced by free-radical polymerization, preferably by emulsion, suspension, solution or bulk polymerization, in particular by emulsion or bulk polymerization.

Particularly suitable graft rubbers also include ABS polymers, which are produced by redox initiation with an initiator system composed of organic hydroperoxide and ascorbic acid according to U.S. Pat. No. 4,937,285.

Since, as is well known, the graft monomers are not necessarily completely grafted onto the graft substrate in the grafting reaction, graft polymers are also understood in accordance with the invention to mean products that result from (co) polymerization of the graft monomers in the presence of the graft substrate and are also obtained in the workup.

Likewise suitable acrylate rubbers are based on graft substrates e.2 which are preferably polymers of alkyl acrylates, optionally with up to 40% by weight, based on e.2, of other polymerizable, ethylenically unsaturated monomers. Preferred polymerizable acrylic esters include $C_1$-$C_8$-alkyl esters, preferably methyl, ethyl, butyl, n-octyl and 2-ethylhexyl esters; haloalkyl esters, preferably halo-$C_1$-$C_8$-alkyl esters, preferably chloroethyl acrylate, glycidyl esters, and mixtures of these monomers. Particularly preferred in this context are graft polymers having butyl acrylate as the core and methyl methacrylates as the shell, in particular Paraloid® EXL2300, Dow Corning Corporation, Midland Michigan, USA.

Further preferably suitable graft substrates according to e.2 are silicone rubbers having graft-active sites, as are described in DE-A 3 704 657, DE-A 3 704 655, DE-A 3 631 540 and DE-A 3 631 539.

Preferred graft polymers comprising a silicone proportion are those comprising methyl methacrylate or styrene-acrylonitrile as the shell and a silicone/acrylate graft as the core. Employable graft polymers having styrene-acrylonitrile as the shell include Metablen® SRK200 for example. Employable graft polymers having methyl methacrylate as the shell include Metablen® S2001, Metablen® S2030 and/or Metablen® SX-005, for example. Particular preference is given to using Metablen® S2001. The products having the Metablen® trade name are available from Mitsubishi Rayon Co., Ltd., Tokyo, Japan.

Crosslinking may be achieved by copolymerizing monomers having more than one polymerizable double bond. Preferred examples of crosslinking monomers are esters of unsaturated monocarboxylic acids having 3 to 8 carbon atoms and unsaturated monohydric alcohols having 3 to 12 carbon atoms or of saturated polyols having 2 to 4 OH groups and 2 to 20 carbon atoms, preferably ethylene glycol dimethacrylate, allyl methacrylate; polyunsaturated heterocyclic compounds, preferably trivinyl cyanurate and triallyl cyanurate; polyfunctional vinyl compounds, preferably di- and trivinylbenzenes; but also triallyl phosphate and diallyl phthalate.

Preferred crosslinking monomers are allyl methacrylate, ethylene glycol dimethacrylate, diallyl phthalate and heterocyclic compounds having at least 3 ethylenically unsaturated groups.

Particularly preferred crosslinking monomers are the cyclic monomers triallyl cyanurate, triallyl isocyanurate, triacryloylhexahydro-s-triazine, triallylbenzenes. The amount of the crosslinked monomers is preferably 0.02% to 5% by weight, in particular 0.05% to 2% by weight, based on 100% by weight of the graft substrate e.2.

For cyclic crosslinking monomers having at least 3 ethylenically unsaturated groups it is advantageous to restrict the amount to below 1% by weight based on 100% by weight of the graft substrate e.2.

Preferred "other" polymerizable, ethylenically unsaturated monomers which, in addition to the acrylic esters, may optionally be used to produce the graft substrate e.2 are acrylonitrile, styrene, α-methylstyrene, acrylamides, vinyl $C_1$-$C_6$-alkyl ethers, methyl methacrylate, glycidyl methacrylate, butadiene. Preferred acrylate rubbers as graft substrate e.2 are emulsion polymers having a gel content of at least 60% by weight.

Other materials that can likewise be used, alongside elastomer modifiers based on graft polymers, are elastomer modifiers which are not based on graft polymers and have glass transition temperatures <10° C., preferably <0° C., particularly preferably <-20° C.. These preferably include elastomers having a block copolymer structure and in addition thermoplastically meltable elastomers, especially EPM, EPDM and/or SEBS rubbers (EPM=ethylene-propylene copolymer, EPDM=ethylene-propylene-diene rubber and SEBS=styrene-ethene-butene-styrene copolymer).

Preferred flame retardants distinct from component c) to be employed as component e) are halogen-free.

The phosphorus-containing flame retardants preferred for use as component e) include phosphorus-containing compounds from the group of organic metal phosphinates, such as metal alkyl phosphinates, in particular zinc bisdiethylphosphinate and especially preferably aluminium trisdiethylphosphinate, and from the group of inorganic metal phosphinates, in particular aluminium phosphinate and zinc phosphinate, of mono- and oligomeric phosphoric and phosphonic esters, especially triphenyl phosphate (TPP), resorcinol bis(diphenylphosphate) (RDP), bisphenol A bis(diphenylphosphate) (BDP) including oligomers, polyphosphonates, especially bisphenol A-diphenyl methylphosphonate copolymers (for example Nofia™ HM1100 [CAS No. 68664 Jun. 2] from FRX Polymers, Chelmsford, USA), and also derivatives of the 9,10-dihydro-9-oxa-10-phosphaphenanthrene 10-oxides (DOPO derivatives), phosphonate amines, metal phosphonates, especially aluminium phosphonate and zinc phosphonate, phosphine oxides and phosphazenes. Particularly preferred phosphazenes are phenoxyphosphazene oligomers. The phosphazenes and production thereof are described for example in EP-A 728 811, DE-A 1961668 and WO-A 97/40092. Particularly preferably employed according to the invention are cyclic phenoxyphosphazenes such as 2,2,4,4,6,6-hexahydro-2,2,4,4,6,6-hexaphenoxytriazatriphosphorines [CAS No. 1184 Oct. 7] and/or those as obtainable for example from Fushimi Pharmaceutical Co. Ltd, Kagawa, Japan under the name Rabitle® FP110 [CAS No. 1203646-63-2].

Likewise employable as flame retardants of the component e) are nitrogen-containing flame retardants, individually or in admixture.

Preference is given to melamine and/or guanidine salts, especially guanidine carbonate, primary guanidine cyanurate, primary guanidine phosphate, secondary guanidine phosphate, primary guanidine sulfate, secondary guanidine sulfate, guanidine pentaerythrityl borate, guanidine neopentyl glycol borate, melamine cyanurate and melamine polyphosphate and also urea phosphate and urea cyanurate. Condensed melamine derivatives such as melem, melam and melon and their reaction products with condensed phosphoric acids may also be used. Likewise suitable are tris (hydroxyethyl) isocyanurate or reaction products thereof with carboxylic acids, benzoguanamine and adducts and salts thereof and also products thereof that are substituted on the nitrogen as well as their salts and adducts. Suitable further nitrogen-containing components include allantoin compounds and also salts thereof with phosphoric acid, boric acid or pyrophosphoric acid, and also glycolurils or salts thereof. Further preferred nitrogen-containing flame retardants are the reaction products of trichlorotriazine, piperazine and morpholine having CAS No. 1078142 Feb. 5, in particular MCA PPM Triazin HF from MCA Technologies GmbH, Biel-Benken, Switzerland.

Other flame retardants or flame retardant synergists not specifically mentioned here may also be employed as component e). These also include purely inorganic phosphorus compounds, in particular red phosphorus or boron phosphate hydrate. It is also possible to employ mineral flame retardant additives distinct from component c) or salts of aliphatic and aromatic sulfonic acids, in particular metal salts of 1-perfluorobutanesulfonic acid. Also suitable are flame retardant synergists from the group of the oxygen-, nitrogen- or sulfur-containing metal compounds wherein metal is antimony, zinc, molybdenum, calcium, titanium, magnesium or boron, preferably antimony trioxide, antimony pentoxide, sodium antimonate, zinc oxide, zinc borate, calcium stannate, zinc stannate, zinc hydroxystannate, zinc sulfide, molybdenum oxide, and, if not already used as colourant, titanium dioxide, magnesium carbonate, calcium carbonate, calcium oxide, titanium nitride, boron nitride, magnesium nitride, zinc nitride, calcium borate, magnesium borate or mixtures thereof.

Further suitable flame retardant additives preferably employable as component e) are char formers, particularly preferably poly(2,6-diphenyl-1,4-phenyl) ether, especially poly(2,6-dimethyl-1,4-phenylene) ether [CAS No. 25134 Jan. 4], phenol-formaldehyde resins, polycarbonates, polyimides, polysulfones, polyethersulfones or polyether ketones, and also anti-drip agents, especially tetrafluoroethylene polymers. The tetrafluoroethylene polymers may be employed in pure form or else in combination with other resins, preferably styrene-acrylonitrile (SAN), or acrylates, preferably methyl methacrylate/butyl acrylate. An especially preferably suitable example of tetrafluoroethylene-styrene-acrylonitrile resins is, for example, Cycolac® INP 449 [CAS No. 1427364-85-9] from Sabic Corp., Riyadh, Saudi Arabia; an especially preferably suitable example of tetrafluoroethylene-acrylate resins is, for example, Metablen A3800 [CAS No. 639808-21-2] from Mitsubishi Rayon Co., Ltd., Tokyo, Japan. Anti-drip agents comprising tetrafluoroethylene polymers are employed as component e) according to the invention preferably in amounts in the range from 0.01 to 5 parts by mass, particularly preferably in the range from 0.05 to 2 parts by mass, in each case based on 100 parts by mass of the component a).

In a particular embodiment of the present invention it is also possible to employ halogenated flame retardants as component e) if the application demands it. These include commercially available organic halogen compounds with or without synergists. Halogenated, in particular brominated and chlorinated, compounds preferably include ethylene-1,2-bistetrabromophthalimide, decabromodiphenylethane, tetrabromobisphenol A epoxy oligomer, tetrabromobisphenol A oligocarbonate, tetrachlorobisphenol A oligocarbonate, polypentabromobenzyl acrylate, brominated polystyrene and brominated polyphenylene ethers.

The flame retardants additionally employable as component e) may be added to the polyalkylene terephthalate or polycycloalkylene terephthalate in pure form or else via masterbatches or compactates.

Heat stabilizers preferably employable as component e) are selected from the group of sulfur-containing stabilizers, especially sulfides, dialkylthiocarbamates or thiodipropionic acids, and also those selected from the group of the iron salts and the copper salts, in the latter case especially copper (I) iodide, being used preferably in combination with potassium iodide and/or sodium hypophosphite $NaH_2PO_2$, and also sterically hindered amines, especially tetramethylpiperidine derivatives, aromatic secondary amines, especially diphenylamines, hydroquinones, substituted resorcinols, salicylates, benzotriazoles and benzophenones, and also sterically hindered phenols and aliphatically or aromatically substituted phosphites, and also differently substituted representatives of these groups.

Among the sterically hindered phenols preference is given to employing those having at least one 3-tert-butyl-4-hydroxy-5-methylphenyl building block and/or at least one 3,5-di(tert-butyl-4-hydroxyphenyl) building block, particular preference being given to 1,6-hexanediol bis [3-(3,5-di-tert-butyl-4-hydroxyphenyl) propionate] [CAS No. 35074-77-2] (Irganox® 259 from BASF SE, Ludwigshafen, Germany), pentaerythritol tetrakis [3-(3,5-di-tert-butyl-4-hydroxyphenyl) propionate] [CAS No. 6683-19-8] (Irganox® 1010 from BASF SE) and 3,9-bis [2-[3-(3-tert-butyl-4-hydroxy-5-methylphenyl) propionyloxy]-1,1-dimethylethyl]-2,4,8,10-tetraoxaspiro[5.5]undecanes [CAS No. 90498-90-1] (ADK Stab® AO 80). ADK Stab® AO 80 is commercially available from Adeka-Palmerole SAS, Mulhouse, France. The use of N,N'-hexamethylenebis-3,5-di-tert-butyl-4-hydroxyhydrocinnamide [CAS No. 23128-74-7] as heat stabilizer, available under the name Irganox® 1098 from BASF SE, Ludwigshafen, Germany, is especially very particularly preferred in accordance with the invention.

Among the aliphatically or aromatically substituted phosphites, preference is given to employing bis(2,4-dicumylphenyl) pentaerythritol diphosphite [CAS No. 154862-43-8], which is available for example from Dover Chemical Corp., Dover, USA under the trade name Doverphos@ S9228, and tetrakis(2,4-di-tert-butylphenyl)-1,1-biphenyl-4,4'-diyl bisphosphonite [CAS No. 38613-77-3], which is obtainable as Hostanox® P-EPQ from Clariant International Ltd., Muttenz, Switzerland.

In a further embodiment of the present invention compositions according to the invention contain as component e) in addition to the components a), b), c) and d) at least one filler or reinforcer, preferably a filler or reinforcer in the form of fibres, in particular glass fibres. According to "http://de.wikipedia.org/wiki/Faser-Kunststoff-Verbund", a distinction is made between chopped fibres, also known as short fibres, having a length in the range from 0.1 to 1 mm, long fibres having a length in the range from 1 to 50 mm and continuous fibres having a length L >50 mm. Short fibres are used in injection moulding and are directly processable with an extruder. Long fibres can likewise still be processed in extruders. Said fibres are widely used in fibre spraying. Long fibres are frequently added to thermosets as a filler. Continuous fibres are used in the form of rovings or fabric in fibre-reinforced plastics. Products comprising continuous fibres achieve the highest stiffness and strength values. Also available are ground glass fibres, the length of these after grinding typically being in the range from 70 to 200 µm.

Prior to processing, in particular prior to processing in a compounder, long glass fibres preferred for use as component e) according to the invention have a starting length in the range from 1 to 50 mm, particularly preferably in the range from 1 to 10 mm, very particularly preferably in the range from 2 to 7 mm. The starting length refers to the average length of the glass fibres as obtained and employed as a raw material before they are processed in a mixing and/or processing procedure to afford compositions according to the invention, in particular to afford moulding materials according to the invention. Fibres, preferably glass fibres, preferred for use as component e) may as a consequence of processing, in particular compounding, to afford the moulding material or to afford the article of manufacture in the moulding material or in the finished article of manufacture, here a charging component, have a $d_{97}$ and/or $d_{50}$ smaller than the originally employed fibres or glass fibres. Thus, the arithmetic average of the fibre length/glass fibre length after processing is frequently only in the range from 150 µm to 300 µm.

In the context of the present invention the fibre length and fibre length distribution/glass fibre length and glass fibre length distribution are in the case of processed fibres/glass fibres determined according to ISO 22314 which provides for initially ashing the samples at 625° C. Subsequently, the ash is placed onto a microscope slide covered with demineralized water in a suitable crystallizing dish and the ash is distributed in an ultrasound bath without action of mechanical forces. The next step comprises drying in an oven at 130° C. followed by determination of the glass fibre length with the aid of optical microscopy images. For this purpose, at least 100 glass fibres are measured from three images, and so a total of 300 glass fibres are used to ascertain the length. The glass fibre length can be calculated either as the arithmetic average In according to the equation $$I_n = \frac{1}{n} \cdot \sum_i^n l_i$$

where $l_i$=length of the ith fibre and n=number of measured fibres and suitably shown as a histogram or for an assumed normal distribution of the measured glass fibre lengths/may be determined using the Gaussian function according to the equation $$f(l) = \frac{1}{\sqrt{2\pi} \cdot \sigma} \cdot e^{-\frac{1}{2}\left(\frac{l-l_c}{\sigma}\right)^2}$$

In this equation, $l_c$ and σ are specific parameters of the normal distribution:/c is the mean and σ is the standard deviation (see: M. Schoßig, Schädigungsmechanismen in faserverstärkten Kunststoffen, 1, 2011, Vieweg und Teubner Verlag, page 35, ISBN 978-3-8348-1483-8). Glass fibres not incorporated into a polymer matrix are analysed with respect to their lengths by the above methods, but without processing by ashing and separation from the ash.

The glass fibres [CAS No. 65997-17-3] preferably employable as a filler of the component e) according to the invention preferably have a fibre diameter in the range from 7 to 18 μm, particularly preferably in the range from 9 to 15 μm, which is determinable by at least one facility available to those skilled in the art, in particular determinable by computer x-ray microtomography analogously to "Quantitative Messung von Faserlängen und-verteilung in faserverstärkten Kunststoffteilen mittels u-Röntgen-Computertomographie", J.KASTNER, et al. DGZfP-Jahrestagung 2007-Vortrag 47. The glass fibres preferably employable as component e) are preferably added in the form of chopped or ground glass fibres.

In one embodiment the fillers and/or reinforcers employable as component e), in particular glass fibres, are preferably provided with a suitable size system and an adhesion promoter/adhesion promoter system particularly preferably based on silane.

Particularly preferred according to the invention therefore are compositions, moulding materials and articles of manufacture, in particular charging components, which contain, in addition to the components a), b), c) and d), component e) glass fibres.

In a further preferred embodiment of the present invention the compositions, moulding materials, articles of manufacture, in particular charging components, according to the invention contain no further components in addition to the components a), b), c) and d).

PREFERRED EMBODIMENTS

The invention preferably relates to compositions or moulding materials containing per 100 parts by mass of polyamide 6 20 to 300 parts by mass, preferably 35 to 250 parts by mass, particularly preferably 50 to 180 parts by mass and very particularly preferably 70 to 120 parts by mass, of aluminium oxide, 20 to 350 parts by mass, preferably 50 to 300 parts by mass, particularly preferably 85 to 250 parts by mass and very particularly preferably 120 to 210 parts by mass, of magnesium hydroxide and 0.1 to 25 parts by mass, preferably 1 to 16 parts by mass, particularly preferably 2 to 10 parts by mass, of 2,2-bis(4-hydroxyphenyl) propane-epichlorohydrin copolymer.

Articles of Manufacture

The present invention additionally provides articles of manufacture of the electricals or electronics industries based on the compositions/moulding materials according to the invention. Preferred articles of manufacture of the electricals industry are charging components, particularly preferably battery charging components for charging electrical batteries, especially preferably battery charging components for charging electrical batteries for electromobility.

Preferred battery charging components according to the invention for charging electrical batteries for electromobility and based on compositions/moulding materials according to the invention are charging cable plugs or charging inlets as shown in FIG. 1 of DE 10 2012 002 882 B4 under reference numerals 10 and 14. The content of DE 10 2012 002 882 B4 is fully incorporated into the present application.

Charging inlets preferred according to the invention based on compositions/moulding materials according to the invention contain at least a rear housing wall, the AC/DC cables, a pin holder, a housing front and a connection mask. It is preferable when a pin holder is based on a composition/moulding material according to the invention. It is especially preferable when a pin holder according to the invention is fabricated from one piece based on compositions/moulding materials according to the invention which accommodates the current-conducting contacts (pins) and thus allows simple mounting and fixing of the pins in the connection mask via the housing front. According to DE 10 2012 002 882 B4 the charging inlet is fastened to the vehicle wiring harness. The vehicle wiring harness contains a plurality of individual cores. A connection is secured to each end of each core. Several openings are formed in the charging inlet to accommodate these connections. Each connection contains a proximal end and a distal end. The proximal end of each connection is fastened to a core and is accommodated by one of the openings formed in the base of the charging inlet, wherein the multiplicity of connections are precisely positioned via a pin holder ideally already for assembly of the charging inlet. The distal end of each connection extends externally from the base of a charging inlet for connection with a mating connector of the charging cable plug.

The invention thus preferably also provides articles of manufacture of the electricals or electronics industries, preferably charging components, particularly preferably battery charging components for charging electrical batteries, especially preferably battery charging components for charging electrical batteries for electromobility, based on compositions/moulding materials containing per 100 parts by mass of polyamide 6

- 20 to 300 parts by mass, preferably 35 to 250 parts by mass, particularly preferably 50 to 180 parts by mass and very particularly preferably 70 to 120 parts by mass, of aluminium oxide,
- 20 to 350 parts by mass, preferably 50 to 300 parts by mass, particularly preferably 85 to 250 parts by mass and very particularly preferably 120 to 210 parts by mass, of magnesium hydroxide and
- 0.1 to 25 parts by mass, preferably 1 to 16 parts by mass, particularly preferably 2 to 10 parts by mass, of 2,2-bis(4-hydroxyphenyl) propane-epichlorohydrin copolymer.

Especially preferred are charging inlets or components of a charging inlet from the group of rear housing wall, pin holder, housing front and connection mask based on compositions/moulding materials containing per 100 parts by mass of polyamide 6

- 20 to 300 parts by mass, preferably 35 to 250 parts by mass, particularly preferably 50 to 180 parts by mass and very particularly preferably 70 to 120 parts by mass, of aluminium oxide,
- 20 to 350 parts by mass, preferably 50 to 300 parts by mass, particularly preferably 85 to 250 parts by mass and very particularly preferably 120 to 210 parts by mass, of magnesium hydroxide and
- 0.1 to 25 parts by mass, preferably 1 to 16 parts by mass, particularly preferably 2 to 10 parts by mass, of 2,2-bis(4-hydroxyphenyl) propane-epichlorohydrin copolymer.

Process

The present invention further provides a process for producing compositions according to the invention, by which the components b), c) and d) and optionally at least one component e) are incorporated into polyamide. This preferably employs extruders or kneaders, particularly preferably extruders. These are commercially available stirring and mixing assemblies.

In one preferred embodiment of the present invention the incorporation of the components b), c) and d) and optionally at least one component e) into the polyamide is carried out at temperatures in the range from 230° C. to 330° C.

The present invention further relates to a process for producing electrical or electronic components, preferably charging components, by processing compositions containing the components a), b), c) and d) optionally with at least one component e) in at least one mixing assembly, preferably a compounder, to afford moulding materials and subjecting these to further processing, preferably an injection moulding process for producing polyamide-based charging components.

Processes according to the invention for producing articles of manufacture by injection moulding are performed at melt temperatures in the range from 230° C. to 330° C., preferably in the range from 270° C. to 300° C., and optionally also at pressures of not more than 2500 bar, preferably at pressures of not more than 2000 bar, particularly preferably at pressures of not more than 1500 bar and very particularly preferably at pressures of not more than 750 bar.

The process of injection moulding comprises melting (plasticizing) the raw material, preferably in pellet form, in a heated cylindrical cavity, and injection thereof as an injection moulding material under pressure into a temperature-controlled cavity. Employed as raw material are compositions according to the invention which have preferably already been processed into a moulding material by compounding, where said moulding material has in turn preferably been processed into a pellet material. After cooling (solidification) of the moulding material injected into the temperature-controlled cavity the injection-moulded part is demoulded.

The present invention preferably relates to a process for producing electrical or electronic components, preferably charging components, by processing compositions containing per 100 parts by mass of polyamide 6
- 20 to 300 parts by mass, preferably 35 to 250 parts by mass, particularly preferably 50 to 180 parts by mass and very particularly preferably 70 to 120 parts by mass, of aluminium oxide,
- 20 to 350 parts by mass, preferably 50 to 300 parts by mass, particularly preferably 85 to 250 parts by mass and very particularly preferably 120 to 210 parts by mass, of magnesium hydroxide and
- 0.1 to 25 parts by mass, preferably 1 to 16 parts by mass, particularly preferably 2 to 10 parts by mass, of 2,2-bis(4-hydroxyphenyl) propane-epichlorohydrin copolymer
- in at least one mixing assembly, preferably a compounder, to afford moulding materials and subjecting these to further processing, preferably an injection moulding process, to produce polyamide-based charging components. It is preferable when at least one component of a charging inlet is produced from the compositions according to the invention/moulding materials based thereon, wherein a component of a charging inlet is to be selected from the group of rear housing wall, pin holder, housing front and connection mask.

Uses

The present invention further provides for the use of the compositions according to the invention for production of articles of manufacture of the electricals or electronics industries, preferably charging components, in particular charging components for electromobility. Preferred charging components are battery charging components for charging electrical batteries, preferably batteries for electromobility, particularly preferably charging cable plugs or charging inlets, in particular charging inlets or components of a charging inlet. Charging inlets preferred according to the invention based on compositions/moulding materials according to the invention contain at least a rear housing wall, the AC/DC cables, a pin holder, the housing front and a connection mask. In the connection mask the electrical contacts (pins) are positioned such that they can precisely accommodate the contacts of the charging plug. Especial preference is given to the use of the compositions or moulding materials according to the invention for production of pin holders according to the invention from one piece based on compositions/moulding materials according to the invention.

Preference is given to the use of compositions containing per 100 parts by mass of polyamide 6
- 20 to 300 parts by mass, preferably 35 to 250 parts by mass, particularly preferably 50 to 180 parts by mass and very particularly preferably 70 to 120 parts by mass, of aluminium oxide,
- 20 to 350 parts by mass, preferably 50 to 300 parts by mass, particularly preferably 85 to 250 parts by mass and very particularly preferably 120 to 210 parts by mass, of magnesium hydroxide and
- 0.1 to 25 parts by mass, preferably 1 to 16 parts by mass, particularly preferably 2 to 10 parts by mass, of 2,2-bis(4-hydroxyphenyl) propane-epichlorohydrin copolymer
- for production of articles of manufacture of the electricals or electronics industries, preferably charging components, in particular charging components for electromobility.

Particular preference is given to the use of compositions containing per 100 parts by mass of polyamide 6
- 20 to 300 parts by mass, preferably 35 to 250 parts by mass, particularly preferably 50 to 180 parts by mass and very particularly preferably 70 to 120 parts by mass, of aluminium oxide,
- 20 to 350 parts by mass, preferably 50 to 300 parts by mass, particularly preferably 85 to 250 parts by mass and very particularly preferably 120 to 210 parts by mass, of magnesium hydroxide and
- 0.1 to 25 parts by mass, preferably 1 to 16 parts by mass, particularly preferably 2 to 10 parts by mass, of 2,2-bis(4-hydroxyphenyl) propane-epichlorohydrin copolymer
- for production of charging inlets or at least one component of a charging inlet from the group of rear housing wall, pin holder, housing front and connection mask.

The examples which follow serve to elucidate the invention but have no limiting effect.

It will be understood that the specification and examples are illustrative but not limitative of the present invention and that other embodiments within the spirit and scope of the invention will suggest themselves to those skilled in the art.

EXAMPLES

The components listed in table 1 were mixed in a ZSK 26 Compounder twin-screw extruder from Coperion Werner & Pfleiderer (Stuttgart, Germany) at a temperature of about 290° C., extruded into a water bath, cooled until pelletizable and pelletized. The pelletized material was dried to constant weight at 70° C. in a vacuum drying cabinet.

The pelletized material was then processed on an Arburg A470 injection moulding machine at melt temperatures between 280° C. and 300° C. and mould temperatures in the range from 80° C. to 100° C. to afford test pieces having dimensions of 125 mm. 13 mm. 0.75 mm for the tests according to UL94, test pieces having dimensions of 60 mm. 45 mm. 2.0 mm for producing the test specimens for the thermal conductivity measurement and test specimens having dimensions of 80 mm. 10 mm. 4 mm for the mechanical tests.

Flame resistance was determined according to the UL94V method (Underwriters Laboratories Inc. Standard of Safety, "Test for Flammability of Plastic Materials for Parts in Devices and Appliances", p. 14 to p. 18 Northbrook 1998).

Flexural strength and edge fibre elongation were obtained from flexural tests in accordance with ISO178-A on test specimens having dimensions of 80 mm. 10 mm. 4 mm.

Impact strength was obtained by the IZOD method according to ISO180-1U on test specimens having dimensions of 80 mm·10 mm. 4 mm.

Thermal conductivity was measured according to the laser flash method according to EN821-2 using a Netzsch LFA447 Nanoflash® instrument. Measurement of thermal conductivity perpendicular to the flow direction of the test specimen (through plane) was effected on test specimens having dimensions of 12.5 mm. 12.5 mm. 2 mm, with the light pulse incident on the side having dimensions of 12.5 mm. 12.5 mm. The respective test specimens were previously milled from a test piece having dimensions of 60 mm. 45 mm·2.0 mm.

Measurement of thermal conductivity in the flow direction of the test specimen (in plane) was effected on 6 test specimens arranged close together in rows and having dimensions of 12.5 mm. 2 mm. 2 mm which were each milled from a test piece having dimensions of 60 mm. 45 mm. 2.0 mm, then rotated about the longitudinal axis by 90° and finally reassembled such that the light pulse was in turn incident on a resulting surface of about 12 mm·12.5 mm.

The quotient of the thermal conductivity perpendicular to the flow direction (through plane) and the thermal conductivity in the flow direction (in plane) served as a measure of the isotropy of the thermal conductivity. At completely isotropic thermal conductivity this assumes a value of 1.

Materials Used:

Component a/1: polyamide 6 (Durethan® B24, from Lanxess Deutschland GmbH, Cologne, Germany)

Component b/1: magnesium hydroxide (Magnifin® 5HIV, Martinswerk GmbH, Bergheim, Germany)

Component c/1: aluminium oxide (Martoxid®) TM4250, Martinswerk GmbH, Bergheim, Germany)

Component d/1:2,2-bis(4-hydroxyphenyl) propane-epichlorohydrin copolymer [CAS-No. 25068-38-6] (Araldite® GT7071 from Huntsman Advanced Materials, Everberg, Belgium)

Employed as component e) were further additives customary for use in polyamides such as nucleating agents (for example based on talc [CAS No. 14807-96-6]) and/or heat stabilizers such as 1,6-bis[3-(3,5-di-tert-butyl-4-hydroxyphenyl) propionylamino]hexane [CAS No. 23128-74-7] (Irganox* 1098, BASF, Ludwigshafen, Germany) and/or demoulding agents such as ethylene-bis-stearylamide [CAS No. 110-30-5] (Loxiol® EBS from Emery Oleochemicals GmbH, Dusseldorf, Germany). The type and amount of the further additives employed as component e) in each case correspond in the examples and comparative examples.

The compositions reported in table 1 were processed as described hereinabove.

TABLE 1

| Component | | Ex. 1 | Comp. 1 |
|---|---|---|---|
| a/1 | [parts by mass] | 100 | 100 |
| b/1 | [parts by mass] | 167 | 161 |
| c/1 | [parts by mass] | 91 | 87 |
| d/1 | [parts by mass] | 3.6 | |
| e | [parts by mass] | 1.5 | 1.4 |
| UL94 (0.75 mm) | Class | V-0 | V-2 |
| IZOD impact strength | [kJ/m$^2$] | 30 | 27 |
| Thermal conductivity [through plane] | [W/mK] | 1.2 | 1.3 |
| Thermal conductivity [in plane] | [W/mK] | 1.7 | 1.6 |
| Isotropy of thermal conductivity | | 0.7 | 0.8 |
| Flexural strength | [MPa] | >160 | >160 |
| Edge fibre elongation | [%] | >1.7 | >1.7 |

TABLE 1 shows that while both Ex. 1 and Comp. 1 exhibited the mechanical performance required according to the problem addressed by the invention with an edge fibre elongation above 1.5% and a flexural strength above 150 MPa and also a thermal conductivity of at least 1 W/mK with sufficient isotropy, the required flammability classification of UL94 V-0 at a wall thickness of 0.75 mm was additionally achieved only in the case of the inventive composition in Ex. 1. Furthermore, the samples based on a composition according to example 1 showed significant advantages in impact strength.

What is claimed is:

1. A composition comprising:
a) at least one polyamide selected from the group consisting of polyamide 6 (PA 6), polyamide 66 (PA 66), and copolyamide of PA6 or PA66,
b) aluminum oxide in an amount of 20 to 300 parts by mass per 100 parts by mass of the at least one polyamide,
c) magnesium hydroxide in an amount of 120 to 350 parts by mass per 100 parts by mass of the at least one polyamide, and
d) 2 to 10 parts by mass per 100 parts by mass of the at least one polyamide of at least one organic, halogen-free, epoxidized compound comprising two epoxy groups per molecule, wherein the at least one epoxidized compound is either:
  (i) an epoxidized compound which is an oligomeric reaction product of bisphenol A with epichlorohydrin having an epoxy index according to ISO 3001 in the range from 450 to 750 grams per equivalent, or
  (ii) an epoxidized compound which includes in any combination and frequency an epoxy-containing unit:

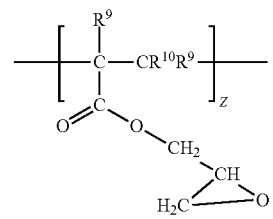

and the unit:

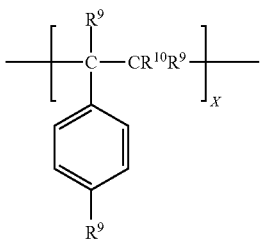

and/or the unit:

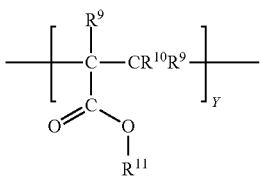

or (iii) an epoxidized compound of formula (II):

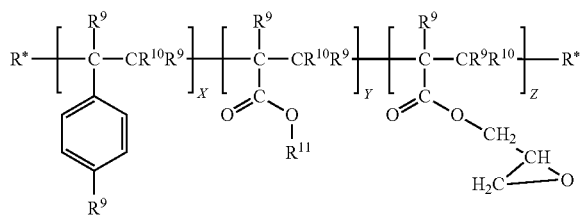

wherein $R^9$, $R^{10}$ independently of one another represent H or $C_1$-$C_6$-alkyl, $R^{11}$ represents $C_1$-$C_6$-alkyl, X and Y each represent integers in the range from 0 to 20, with the proviso that either X or Y is ≥1 at least once, and Z represents an integer in the range from 2 to 20, R* represents H or $C_1$-$C_8$-alkyl, and wherein the units designated X, Y, Z may occur repeatedly and in any desired sequence, or (iv) an epoxidized compound is an oligomeric reaction product of bisphenol A with epichlorohydrin of formula (III):

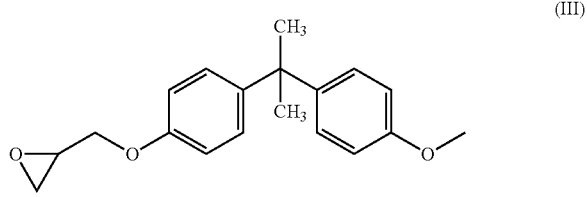

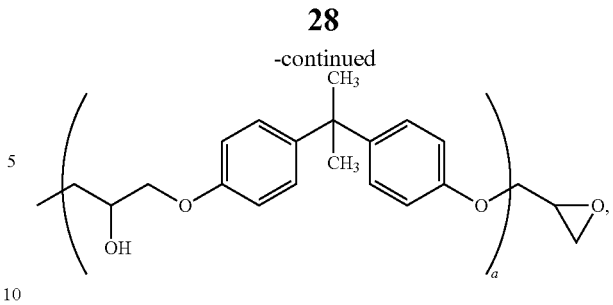

wherein a represents average number of repeating units and is an integer from 0 to 12, and wherein the composition exhibits a UL94 V-0 flammability classification at wall thicknesses ≤ 0.75 mm.

2. The composition according to claim 1, wherein the aluminum oxide is present in an amount from 70 to 120 parts by mass per 100 parts by mass of the at least one polyamide.

3. The composition according to claim 1, wherein the magnesium hydroxide is present in an amount from 120 to 210 parts by mass per 100 parts by mass of the at least one polyamide.

4. The composition according to claim 1, wherein at least one of the two epoxy groups is terminal.

5. The composition according to claim 1, wherein the at least one polyamide is selected from semicrystalline polyamides which have a melting enthalpy in the range from 4 to 25 J/g measured by the DSC method according to ISO 11357 in the $2^{nd}$ heating and integration of the melting peak.

6. An article of manufacture for the electrical or electronics industries which comprises the composition according to claim 1.

7. The article according to claim 6, wherein the article is a charging component.

8. The article according to claim 7, wherein the article is a charging component for electromobility.

9. The article according to claim 8, wherein the charging component is a battery charging component for charging electrical batteries.

10. The article according to claim 7, wherein the charging component is a charging cable plug, a charging inlet or a component of a charging inlet.

11. The article according to claim 10, wherein the charging component is a pin holder of a charging inlet.

12. A process for producing an article of manufacture for of the electrical or electronics industries, comprising the steps of processing a composition into a molding material by mixing components of the composition together, extruding the composition in a water bath, cooling the extruded composition until palletizable, pelletizing the cooled and palletizable composition, and injecting molding pellets of the composition to form the article of manufacture, wherein the composition comprises:

a) at least one polyamide selected from the group consisting of polyamide 6 (PA 6), polyamide 66 (PA 66), and copolyamide of PA6 or PA66, b) aluminum oxide in an amount of 20 to 300 parts by mass per 100 parts by mass of the at least one polyamide, c) magnesium hydroxide in an amount of 120 to 350 parts by mass per 100 parts by mass of the at least one polyamide, and d) 2 to 10 parts by mass per 100 parts by mass of the at least one polyamide of at least one organic, halogen-free, epoxidized compound comprising two epoxy groups per molecule, wherein the at least one epoxidized compound is either:

(i) an epoxidized compound which is an oligomeric reaction product of bisphenol A with epichlorohydrin having an epoxy index according to ISO 3001 in the range from 450 to 750 grams per equivalent, or (ii) an epoxidized compound which includes in any combination and frequency an epoxy-containing unit:

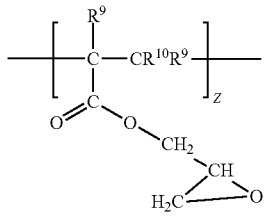

and the unit:

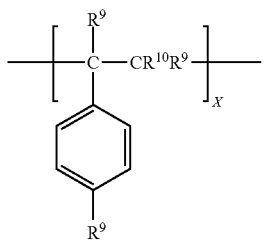

and/or the unit:

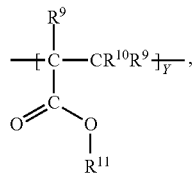

or (iii) an epoxidized compound of formula (II):

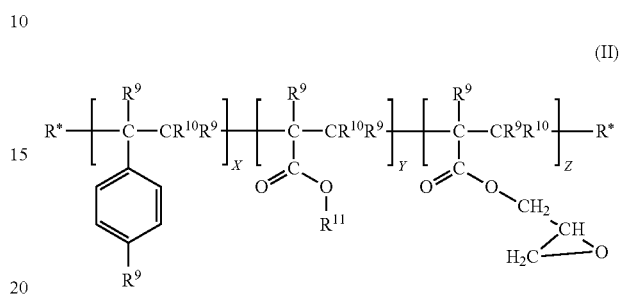

wherein $R^9$, $R^{10}$ independently of one another represent H or $C_1$-$C_6$-alkyl, $R^{11}$ represents $C_1$-$C_6$-alkyl, X and Y each represent integers in the range from 0 to 20, with the proviso that either X or Y is $\geq 1$ at least once, and Z represents an integer in the range from 2 to 20, R* represents H or $C_1$-$C_8$-alkyl, and wherein the units designated X, Y, Z may occur repeatedly and in any desired sequence, or (iv) an epoxidized compound is an oligomeric reaction product of bisphenol A with epichlorohydrin of formula (III):

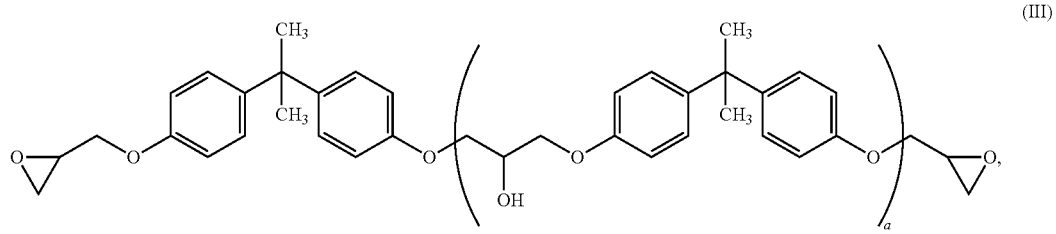

wherein a represents average number of repeating units and is an integer from 0 to 12, and wherein the composition exhibits a UL94 V-0 flammability classification at wall thicknesses≤ 0.75 mm.

13. The process according to claim 12, wherein the article of manufacture is a charging component.

14. The process according to claim 13, wherein the article of manufacture is a battery charging component.

15. The process according to claim 13, wherein the article of manufacture is a charging cable plug, a charging inlet or a component of a charging inlet.

16. A moulding material which comprises the composition according to claim 1.

17. An article of manufacture for the electrical or electronics industries which comprises the moulding material according to claim 16.

18. A composition comprising:
    (a) at least one polyamide,
    (b) 70 to 300 parts by mass per 100 parts by mass of the at least one polyamide of aluminum oxide,
    (c) 120 to 350 parts by mass per 100 parts by mass of the at least one polyamide of magnesium hydroxide, and
    (d) 2 to 10 parts by mass per 100 parts of the at least one polyamide of at least one organic, halogen-free, epoxidized compound, wherein the at least one organic, halogen-free, epoxidized compound is an oligomeric reaction product of bisphenol A with epichlorohydrin having an epoxy index according to ISO 3001 in the range from 450 to 750 grams per equivalent, and wherein the composition exhibits a UL94 V-0 flammability classification at wall thicknesses ≤0.75 mm.

19. A method of increasing UL94 flammability classification of a component having a wall thickness≤0.75 mm which is formed of a composition comprising:
    (a) at least one polyamide,
    (b) aluminum oxide, and
    (c) 120 to 350 parts by mass per 100 parts by mass of the at least one polyamide of magnesium hydroxide, wherein the method comprises incorporating into the composition an effective UL94 flammability classification increasing amount of at least one organic, halogen-free, epoxidized compound, wherein the at least one organic, halogen-free, epoxidized compound is an oligomeric reaction product of bisphenol A with epichlorohydrin having an epoxy index according to ISO 3001 in the range from 450 to 750 grams per equivalent.

* * * * *